United States Patent [19]

Fulmer

[11] 4,132,127

[45] Jan. 2, 1979

[54] BRAKE PEDAL MECHANISM

[75] Inventor: Keith H. Fulmer, Mishawaka, Ind.

[73] Assignee: The Bendix Corporation, Southfield, Mich.

[21] Appl. No.: 830,923

[22] Filed: Sep. 6, 1977

[51] Int. Cl.² ............................................. G05G 1/14
[52] U.S. Cl. ................................................... 74/512
[58] Field of Search ........................ 74/512; 180/82 B

[56] References Cited

U.S. PATENT DOCUMENTS

| | | | |
|---|---|---|---|
| 3,988,945 | 11/1976 | Fasano | 74/512 |
| 4,026,164 | 5/1977 | Mozingo | 74/512 X |

Primary Examiner—Leonard H. Gerin

Attorney, Agent, or Firm—Leo H. McCormick, Jr.; Ken C. Decker

[57] ABSTRACT

A brake pedal assembly including a pedal lever pivotally attached to a housing, a plate having a cam surface pivotally attached on the pedal lever, a push rod attached to the plate, and a roller fixed to the housing which is adapted to engage the cam surface on the plate. An operator input applied to the pedal lever moves the pedal lever in an arc with respect to the pivotal attachment with the housing. The plate moves with the pedal lever and rotating thereon as the cam engages the roller to provide the push rod with linear movement for moving the push rod.

5 Claims, 3 Drawing Figures

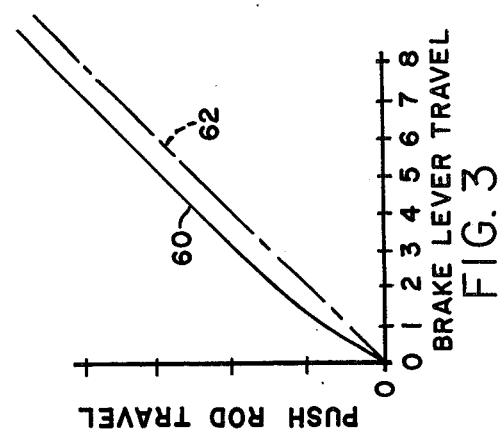
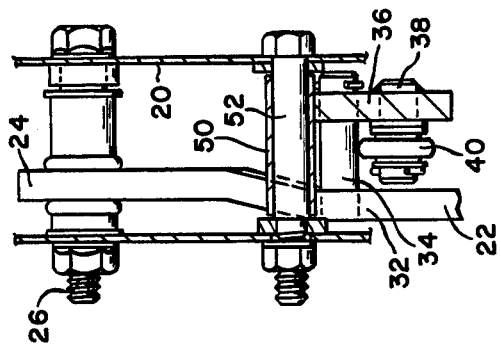
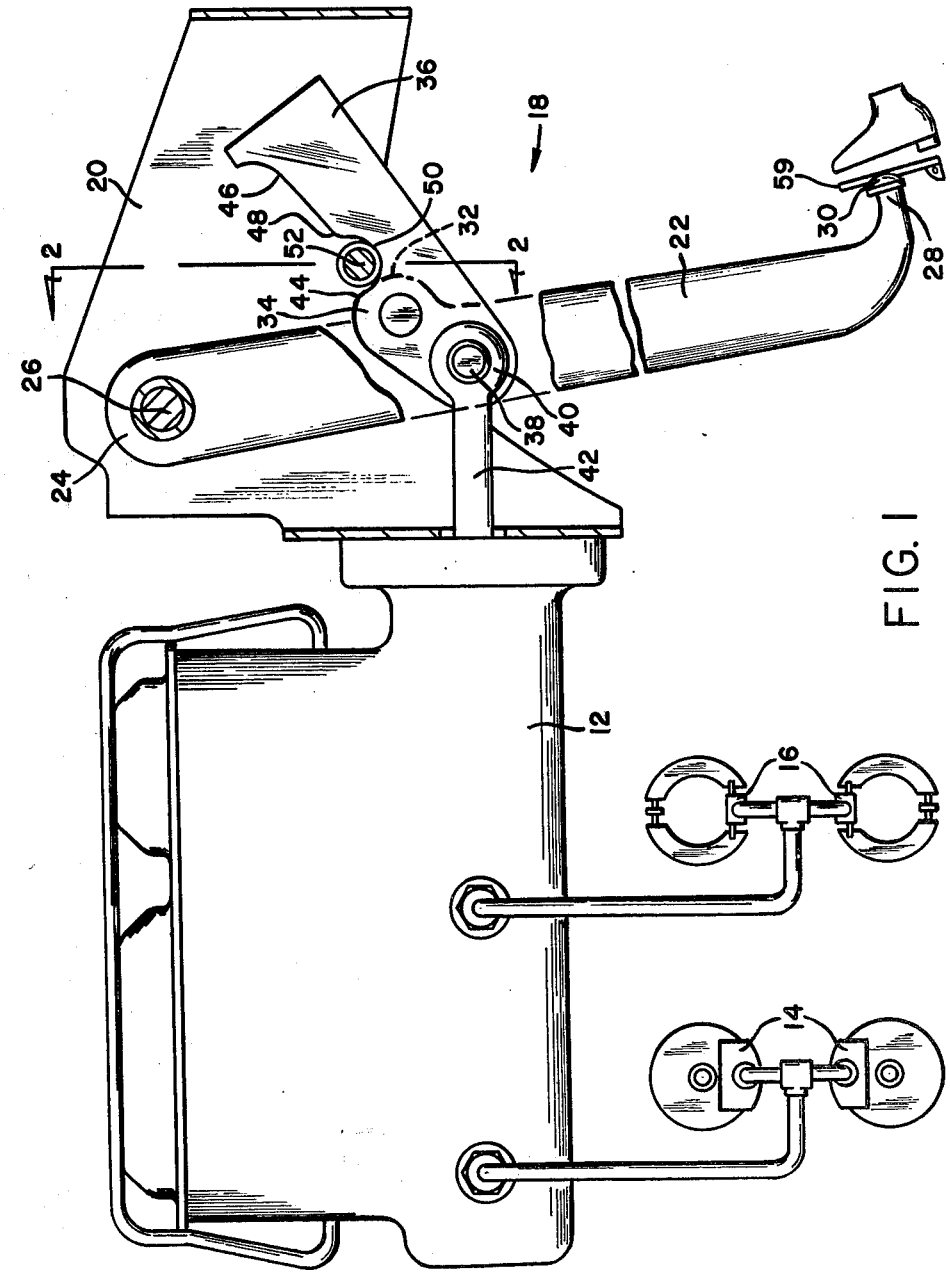

BRAKE PEDAL MECHANISM

BACKGROUND OF THE INVENTION

This invention relates to a brake pedal assembly for providing a master cylinder with an operational input to effect a brake application.

In brake systems of most motor vehicles, a certain amount of lost motion occurs in moving the brake shoes or brake pad into engagement with the brake drum or rotors. The brake pedal movement required to bring the brake systems into operation can account for as much as one third of the total operational stroke of a brake pedal.

Several attempts have been made to develop brake pedal linkages which change the ratio of movement of an output push rod as compared to the brake pedal such as the toggle linkage disclosed in U.S. Pat. No. 3,142,199, the lever and diaphragm arrangment disclosed in U.S. Pat. No. 3,263,428, the slotted lever disclosed in U.S. Pat. No. 3,063,427, the resiliently positioned levers in U.S. Pat. No. 3,633,366 and the lever and cam arrangement disclosed in U.S. Pat. No. 3,646,831. The disadvantage in many these prior art brake pedals is the numerous parts required to cofunction to produce a variance in the movement of the output push rod as compared to the input movement of a brake pedal.

In addition, the height of the brake pedal with respect to the floor of a vehicle is increased, requiring an operator to raise his foot to a different height than the accelerator to move the brake pedal rather than merely rotating the foot from the accelerator to the brake pedal as now experienced by most drivers in currently produced vehicles.

SUMMARY OF THE INVENTION

I have devised a brake pedal arrangement for use with a push rod to supply a master cylinder with varying movement to rapidly bring the components in a brake system to an operational condition without an increase in the currently available brake pedal travel while allowing the brake pedal and accelerator to remain in substantially the same plane with respect to the foot of the operator.

The brake pedal arrangement has a brake lever with a first end pivotally attached to a housing and a second end which is free to rotate about the first end. A plate pivotally attached to the brake lever is connected to a push rod. The plate has a cam surface thereon held against a roller by a reactionary force from the master cylinder acting on the push rod. An operator applied input to the second end moves the brake lever and plate in an arc about the first end. At the same time, the cam surface engages the roller and rotates the plate on the lever. The arcuate movement and the rotative movement are combined in the plate to provide the push rod with linear movement to operate the master cylinder and effect a brake application.

It is an object of this invention to provide a brake system with a lever arrangement through which a uniform rate of movement of a brake pedal is modified to rapidly move a push rod until a brake system is in an operational condition and thereafter is moved at a uniform rate to develop an ultimate output force corresponding to the optimum force associated with movement of the brake pedal.

It is another object of this invention to provide a push rod attached to a plate with linear movement created by combining arcuate movement associated with a movement of a brake pedal lever about a pivotal connection and rotative movement of the plate on the brake pedal lever through the engaagement of a cam surface with a roller.

These and other objects of this invention should be apparent to those skilled in the art from reading this specification while viewing the drawing.

BRIEF DESCRIPTION OF THE DRAWINGS

FIG. 1 is a schematic illustration of a brake system including a brake pedal arrangement made according to the principles of this invention;

FIG. 2 is a sectional view taken along line 2—2 of FIG. 1; and

FIG. 3 is a graph comparing the uniform arcuate movement of a brake pedal with the linear output movement of a push rod connected to a master cylinder in the brake system.

DETAILED DESCRIPTION OF THE INVENTION

In the brake system 10 shown in FIG. 1 a master cylinder 12 is connected to the front and rear wheel brakes 14 and 16, respectively, of a vehicle. The master cylinder 12 responds to an operator input applied to the brake pedal assembly 18 and supplies the front and rear wheel brakes 14 and 16 with fluid pressure to effect a brake application.

The brake pedal assembly 18 has a housing or hanger member 20 which is located between the dash and firewall of a vehicle for positioning a brake lever 22 in the driver compartment. The brake lever 22 has an end 24 pivotally mounted on pin 26 which is fixed to the housing 20 and a second end 28. A pad 30 attached to the second end 28 provides a surface through which an operator can apply an input force for moving the brake lever 22 in an arc about pin 26.

The brake lever 22 has a projection 32 for providing support surface for pin 34 attached thereto. A plate 36 which is pivotally mounted on pin 34 has a pin 38, see FIG. 2, fixed to the end thereof for retaining eye 40 of push rod 42 going to the master cylinder 12.

The plate 36 has a cam surface with a first section 44 having a circular curve, a second section 46 having a spiral curve and a third section 48 for transitioning the circular curve to the spiral curve.

The cam surface on plate 36 is held against a roller 50 mounted on pin 52 through a reactionary of return force in the master cylinder 12 acting on push rod 42.

MODE OF OPERATION OF THE INVENTION

When a vehicle operator desires to effect a brake application, an input force can be applied to pad 30 by the operator rotating his foot off the accelerator pedal 59. Thereafter, the input force applied to pad 30 causes brake lever 22 to rotate in an arc about pin 26. The input force is modified by a ratio of the distance between pin 26 and end 28 divided by the distance between pin 26 and pin 34.

The modified input force is transmitted through pin 34 into plate 36 for distribution through pin 38 into push rod 42. As brake lever 22 moves from the rest position shown in FIG. 1, in response to the input force, cam surface on plate 36 engages roller 50 on pin 52 and rotates the plate 36 with respect to pin 34. This rotation when combined with the arcuation movement of the brake lever is combined to provide linear movement for push rod 42.

To evaluate the change in linear movement of the push rod 42 with respect to the arcuate movement of the brake lever 22, the arcuate travel of the brake lever was divided into equal segments and the distance the push rod 42 moved for each segment plotted to establish curve 60 in FIG. 3.

In comparing curve 60 with curve 62 which illustrates the movement of a push rod which is directly attached to a brake lever, it is noted that the push rod 42 initially moves at a faster rate than the brake lever 22. This is a desirable feature permitting the operational pistons in the master cylinder 12 to move past the compensator ports therein and begin to supply the wheel brakes 14 and 16 with brake fluid at a relatively low pressure which is sufficient to bring the pads into engagement with the rotors and the segments into engagement with the drums with relative little movement of the brake lever. Thereafter, as the brake pedal 22 moves through its remaining arcuate stroke about pin 26, roller 50 moves through the transition section 48 of the cam surface and follows the spiral curve 46. The rotation of the plate 36 due to the spiral curve 46 causes pin 38 to move push rod 42 a substantially equal distance for each interval of movement of the brake lever 22. When the brake lever 22 moves through its entire stroke, push rod 42 movement is equal to the total movement experienced through the use of a push rod fixed to a brake lever.

Upon termination of the input force by the operator to pad 30, a return spring in the master cylinder 12 moves push rod 42 toward the rest position shown in FIG. 1. When the push rod 42 moves the circular section 44 of the cam surface into engagement with roller 50, the rearward movement of the brake lever 22 is halted and retained in this position where pad 30 and accelerator lever 59 are in substantially the same plane with respect to the foot of the operator.

I claim:

1. A linkage mechanism for moving an output member at a variable rate in response to uniform movement of an input member, comprising:
   a housing;
   a lever having a first end pivotally attached to said housing and a second end;
   a plate pivotally attached to said lever having a cam surface thereon;
   a push rod pivotally attached to said plate; and
   a pin fixed to said housing, said cam surface being adapted to continually engage said pin, said lever moving in an arc about said first end in response to an input force applied to said second end, said plate moving with said lever and rotating on said lever as said cam surface moves with respect to said pin to provide said push rod with linear movement, said linear movement being a function of the arcuate movement of said lever and the rotative movement of said plate.

2. The linkage mechanism, as recited in claim 1, further including:
   a roller mounted on said pin to reduce the sliding friction associated with the movement of said cam surface.

3. The linkage mechanism, as recited in claim 2 wherein said cam surface includes:
   a circular section which engages said roller to limit the movement of said lever upon termination of the input force.

4. The linkage mechanism, as recited in claim 3, wherein said cam surface further includes:
   a curved section which retards the rotation of said plate after a predetermined arcuate rotation of said lever to maintain said push rod in a substantially axial plane during the linear movement thereof; and
   a transition section for providing a smooth rolling surface between said circular section and said curved section.

5. The linkage mechanism, as recited in claim 4, wherein said transition section of the cam surface causes an initial rotation of the plate that adds to the linear movement of the push rod and later retards the rotation to blend with the retarded rotation caused by the engagement of the curved section with the roller.

* * * * *